(12) United States Patent
Willey et al.

(10) Patent No.: US 11,536,471 B2
(45) Date of Patent: Dec. 27, 2022

(54) ADJUSTABLE MOTOR MOUNT

(71) Applicant: Johnson Controls Technology Company, Auburn Hills, MI (US)

(72) Inventors: Zachary A. Willey, Henrico, VA (US); John L. McElvany, Norman, OK (US); Anthony J. Reardon, Moore, OK (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 338 days.

(21) Appl. No.: 16/723,293

(22) Filed: Dec. 20, 2019

(65) Prior Publication Data

US 2021/0190334 A1    Jun. 24, 2021

(51) Int. Cl.
| | | |
|---|---|---|
| *F24F 13/20* | (2006.01) | |
| *F24F 3/044* | (2006.01) | |
| *F16H 7/12* | (2006.01) | |
| *F16H 7/08* | (2006.01) | |

(52) U.S. Cl.
CPC .......... *F24F 3/044* (2013.01); *F16H 7/1281* (2013.01); *F16H 2007/0844* (2013.01); *F24F 2013/205* (2013.01)

(58) Field of Classification Search
CPC .. F16M 5/00; F16M 7/00; H02K 15/14; F24F 2013/205
See application file for complete search history.

(56) References Cited

U.S. PATENT DOCUMENTS

| | | | | | |
|---|---|---|---|---|---|
| 2,646,951 | A | * | 7/1953 | Sloyan | H02K 5/26 248/655 |
| 2,765,997 | A | * | 10/1956 | Motts | H02K 5/26 248/657 |
| 3,066,898 | A | * | 12/1962 | Haynes | F16M 7/00 248/656 |
| 4,012,021 | A | * | 3/1977 | Duceppe | H02K 5/26 310/91 |
| 4,455,011 | A | * | 6/1984 | Levine | H02K 5/26 248/646 |
| 6,450,782 | B1 | | 9/2002 | Sakamoto | |
| 7,028,970 | B1 | | 4/2006 | Wiseman | |
| 9,973,056 | B2 | | 5/2018 | Copanas | |
| 2011/0294614 | A1 | | 12/2011 | Bigler | |

FOREIGN PATENT DOCUMENTS

| | | |
|---|---|---|
| DE | 102011106998 A1 | 1/2013 |
| EP | 1239258 B1 | 9/2002 |
| EP | 2416047 B1 | 2/2012 |
| EP | 2541738 A3 | 1/2013 |
| EP | 3091268 B1 | 11/2016 |
| WO | 2018119919 A1 | 7/2018 |

\* cited by examiner

*Primary Examiner* — Lionel Nouketcha
(74) *Attorney, Agent, or Firm* — Fletcher Yoder, P.C.

(57) ABSTRACT

A heating ventilation, and/or air conditioning (HVAC) system includes a support structure having a mounting rail, a first mounting bracket coupled to the mounting rail and configured to be adjustably positioned along a first axis of the mounting rail, and a second mounting bracket directly coupled to the first mounting bracket. The second mounting bracket is configured to support a fan motor mounted thereto, the second mounting bracket is configured to be adjustably positioned along a second axis of the first mounting bracket, and the second axis of the first mounting bracket is transverse to the first axis of the mounting rail.

25 Claims, 8 Drawing Sheets

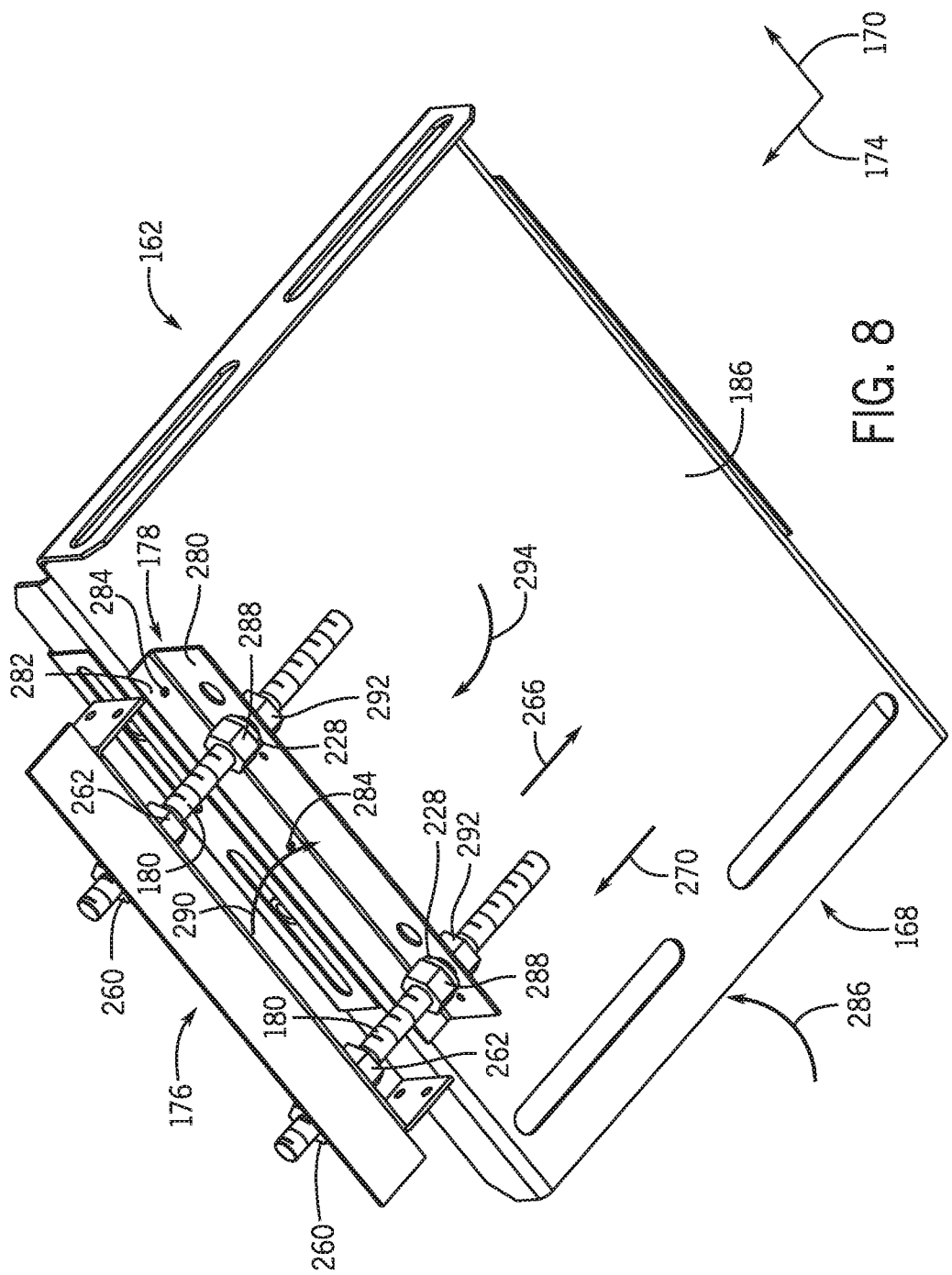

ADJUSTABLE MOTOR MOUNT

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. The HVAC system may include a blower configured to direct the supply air flow through the HVAC system. The blower may be driven by a motor configured to rotate the blower to direct the supply air flow. In some embodiments, a belt may be implemented to transfer rotational motion of the motor to the blower. However, it may be difficult to position the motor with respect to the blower to effectively and efficiently rotate the blower via the motor.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating ventilation, and/or air conditioning (HVAC) system includes a support structure having a mounting rail, a first mounting bracket coupled to the mounting rail and configured to be adjustably positioned along a first axis of the mounting rail, and a second mounting bracket directly coupled to the first mounting bracket. The second mounting bracket is configured to support a fan motor mounted thereto, the second mounting bracket is configured to be adjustably positioned along a second axis of the first mounting bracket, and the second axis of the first mounting bracket is transverse to the first axis of the mounting rail.

In another embodiment, a motor mount for a heating, ventilation, and air conditioning (HVAC) system includes a first mounting bracket configured to couple to a mounting rail of the HVAC system and a second mounting bracket configured to directly couple to the first mounting bracket. The second mounting bracket is adjustably positioned relative to the first mounting bracket along a first axis. The motor mount also includes a fixed bracket configured to fixedly couple to the mounting rail and a rod configured to extend through the first mounting bracket and the fixed bracket. The rod is configured to enable adjustment of a position of the first mounting bracket relative to the fixed bracket along a second axis transverse to the first axis.

In another embodiment, a heating ventilation, and/or air conditioning (HVAC) system includes a support structure having a first mounting rail and a second mounting rail that each extends along a first axis, and a first mounting bracket having a base plate and a side flange extending transversely from the base plate. The base plate is configured to abut the first mounting rail and the second mounting rail, the side flange is configured to abut the first mounting rail, and a position of the first mounting bracket is adjustable along the first axis. The HVAC system further includes a second mounting bracket coupled to the first mounting bracket. A position of the second mounting bracket is adjustable along a second axis that is transverse to the first axis, and the second mounting bracket is configured to secure a motor thereto.

DRAWINGS

Various aspects of this disclosure may be better understood upon reading the following detailed description and upon reference to the drawings in which:

FIG. 8 is a bottom perspective view of the motor mount of FIGS. 6 and 7, in accordance with an aspect of the present disclosure.

DETAILED DESCRIPTION

Figure 1:
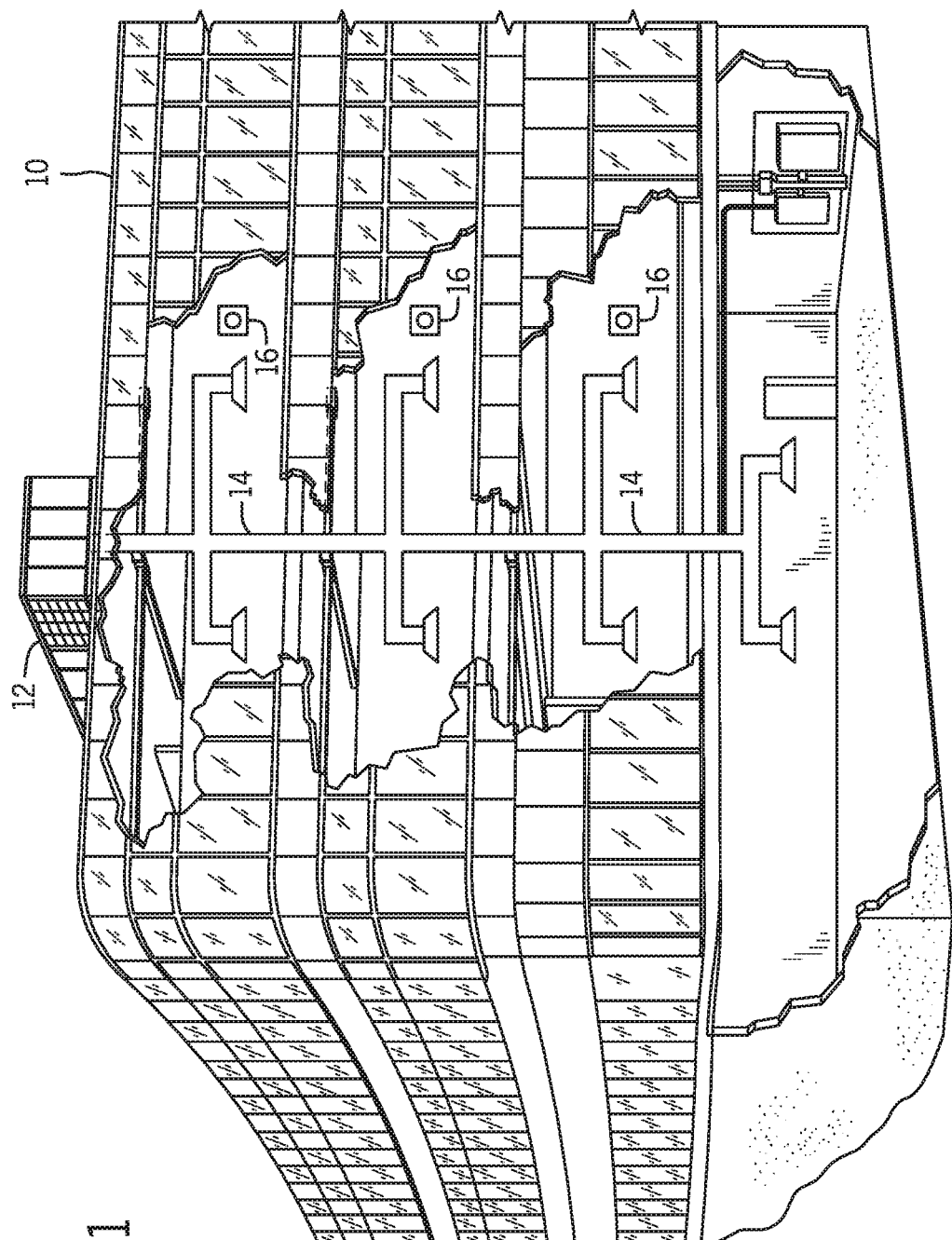
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements.

The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system that uses a blower to direct an air flow through the HVAC system. In some embodiments, the blower may be rotatably coupled to a motor, which drives the blower to rotate so as to draw or force the air flow through the HVAC system. A belt may also be implemented to transfer rotational motion of the motor to the blower. For this reason, the motor may be selectively positioned relative to the motor to enable effective operation of the blower. For example, the motor may be positioned in a particular location to align the motor with the blower for installation and/or adjustment of the belt.

However, in conventional HVAC systems, it may be difficult to acutely adjust the position of the motor relative to the blower. For example, the motor may not be easily movable to enable sufficient access for installing the belt. Additionally or alternatively, the position of the motor may not be easily adjustable, such as for moving the motor after the belt has been attached to the motor and the blower. As such, it may be difficult to position the motor in order to operate the blower desirably.

Thus, it is presently recognized that a system for facilitating acute positioning of the motor relative to the blower may improve the operation and/or manufacture of the HVAC system. Accordingly, embodiments of the present disclosure are directed to a motor mount configured to enable the adjustment of the motor in multiple directions relative to the blower. For instance, the motor mount may include a first bracket configured to move along a first axis relative to the blower. Furthermore, the motor mount may include a second bracket to which the motor may be coupled, and the second bracket may be coupled to the first bracket and may be configured to move relative to the first bracket and to the blower along a second axis transverse to the first axis. In this manner, the first bracket and the second bracket enable adjustment of the motor relative to the blower in multiple directions to facilitate desirable positioning of the motor during operation, installation, replacement, maintenance, and so forth.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
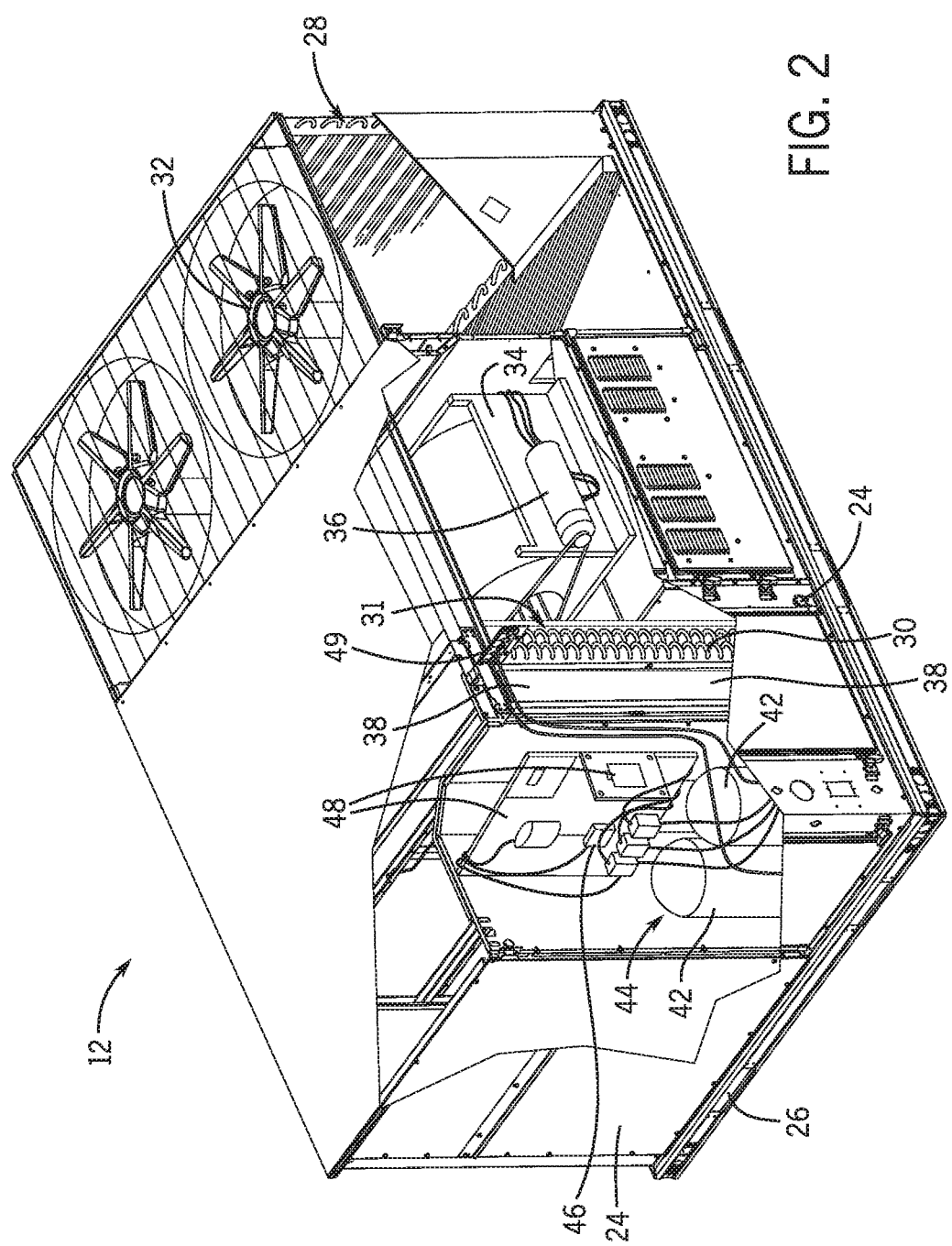
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
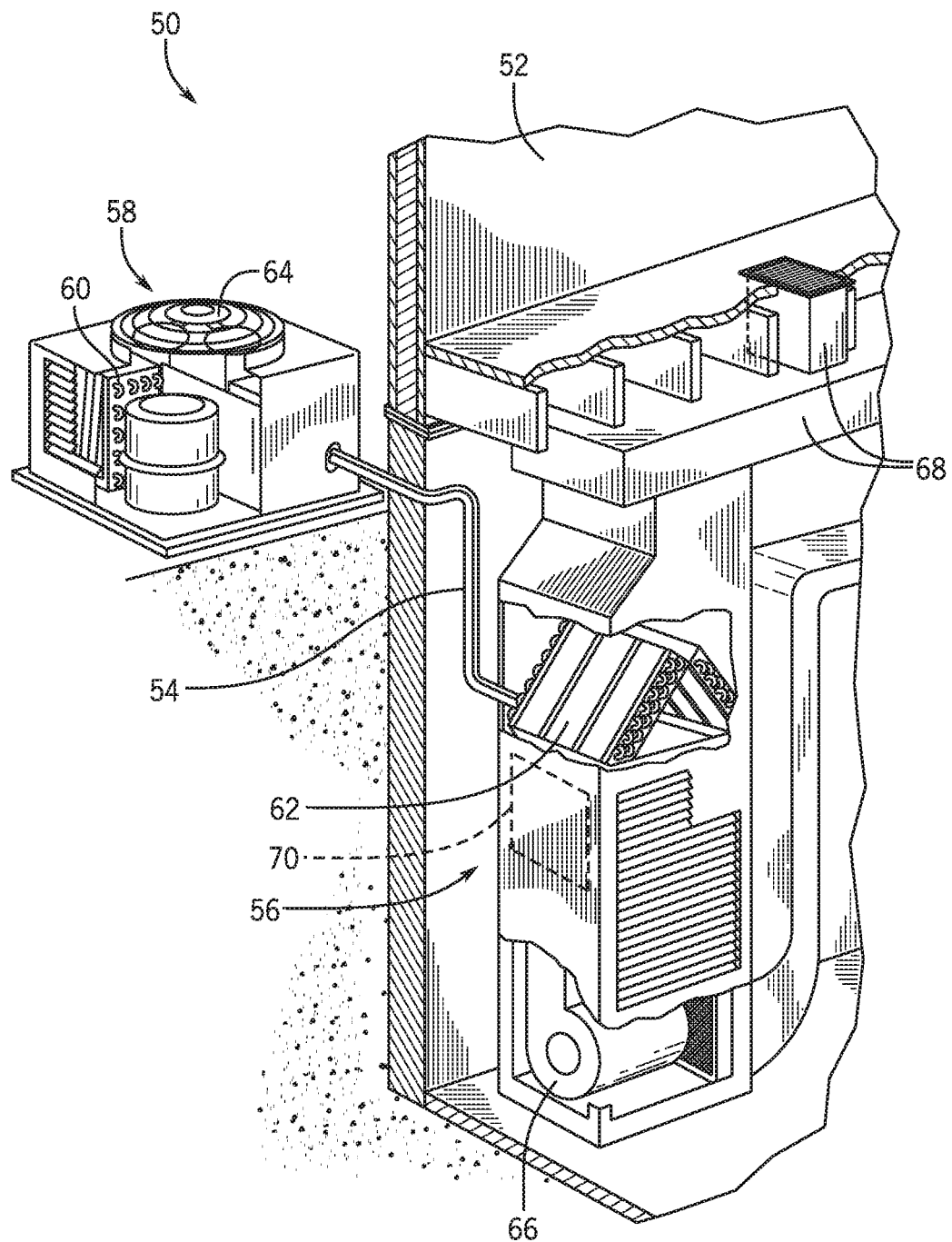
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
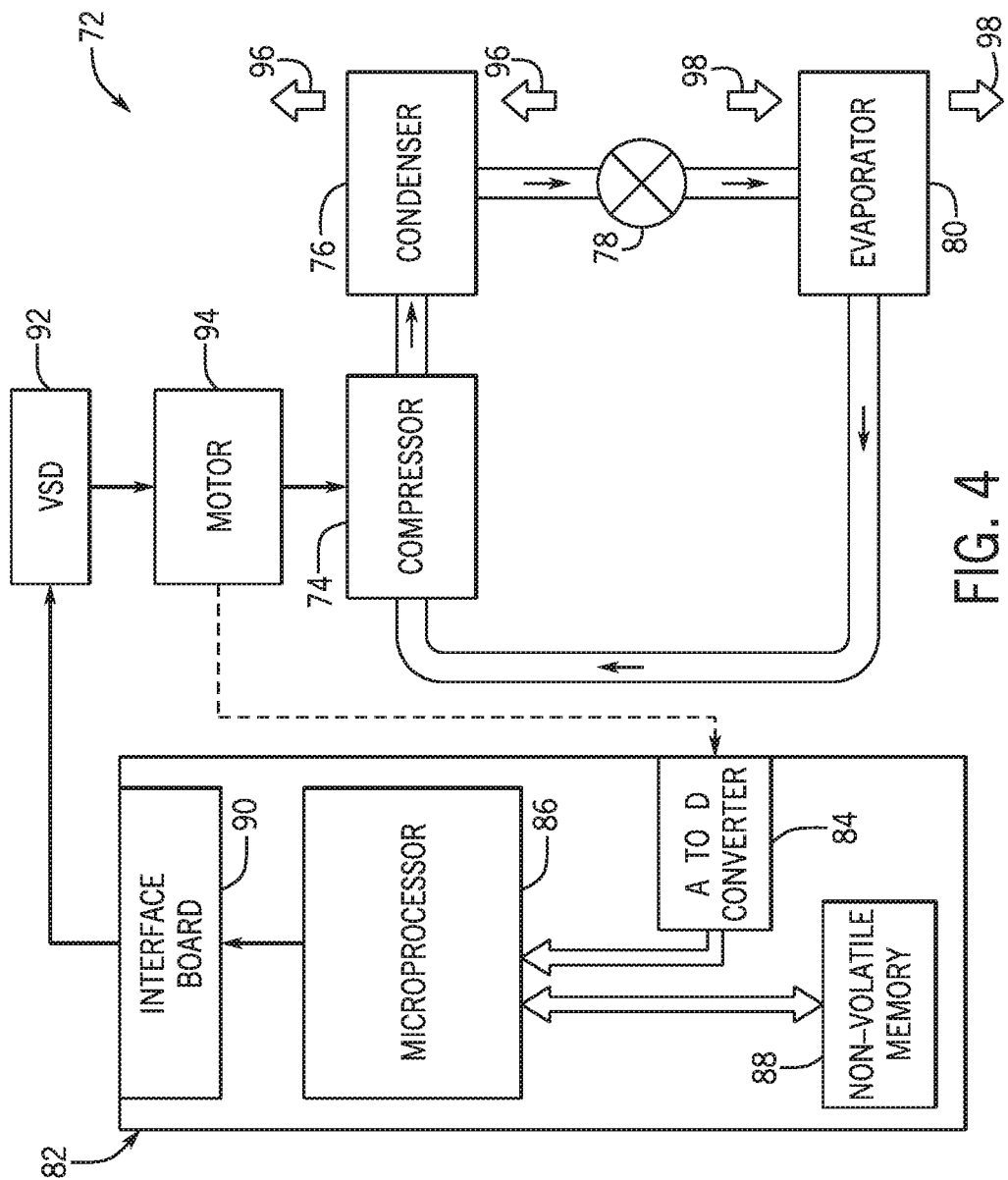
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to an HVAC system that includes a blower configured to direct an air flow through the HVAC system. The HVAC system may also include a motor configured to drive the blower to rotate in order to direct the air flow through the HVAC system. In accordance with present techniques, the HVAC system further includes an adjustable motor mount configured to mount the motor relative to the blower in any of a variety of positions. In some embodiments, the HVAC system may include a mounting rail extending adjacent to the blower, and the motor mount may include a first bracket and a second bracket. The first bracket may be adjustably coupled to the mounting rail, such that the first bracket is configured to move along a first axis of the mounting rail relative to the blower. The second bracket may be adjustably coupled to the first bracket, such that the second bracket may move relative to the blower along a second axis of the second bracket transverse to the first axis. The motor may be configured to couple to the second bracket so that the motor may be moved along the first axis and the second axis relative to the blower. In this way, the position of the motor relative to the blower may be adjusted in multiple directions.

Figure 5:
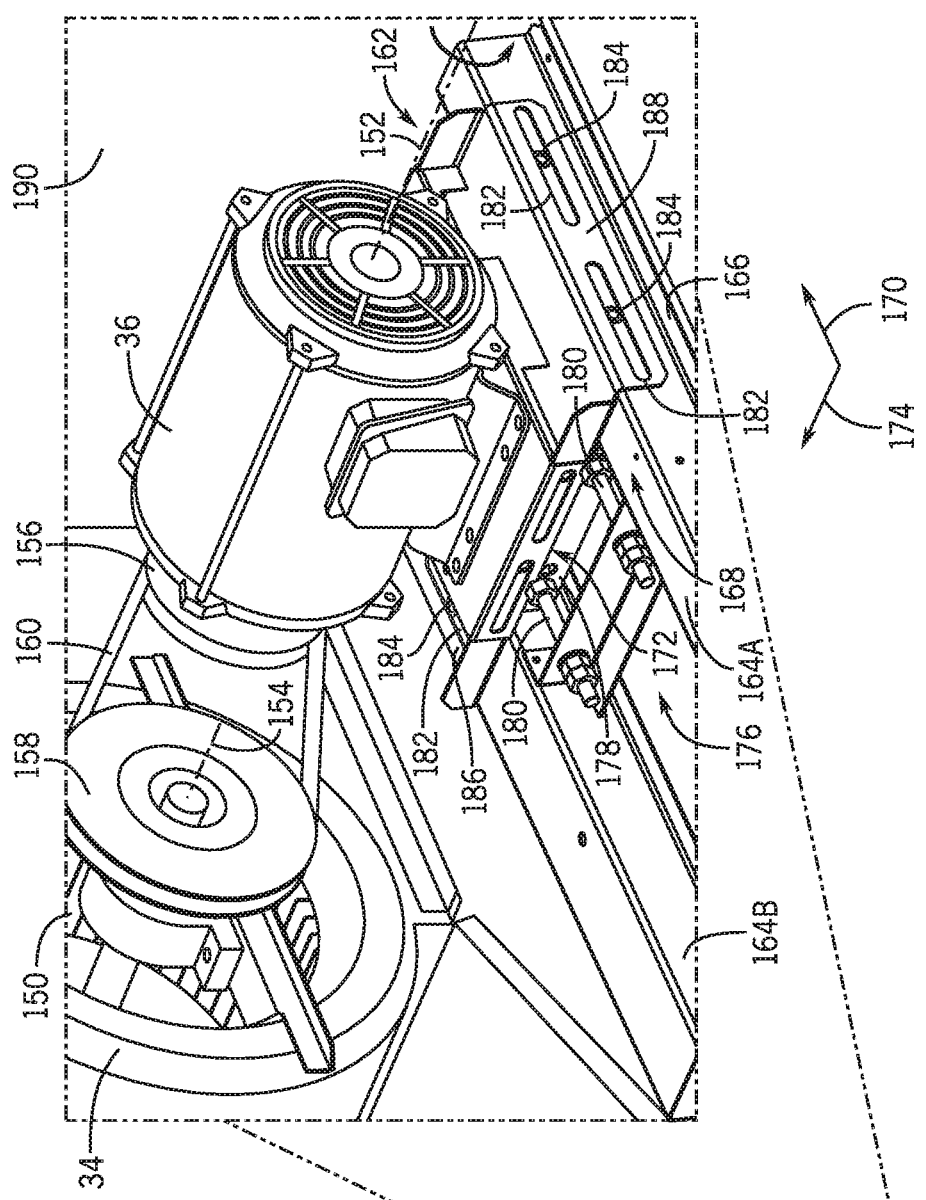
FIG. 5 is an expanded perspective view of an embodiment of a blower assembly and a motor that may each be employed in an HVAC unit, in accordance with an aspect of the present disclosure.
Figure 5:
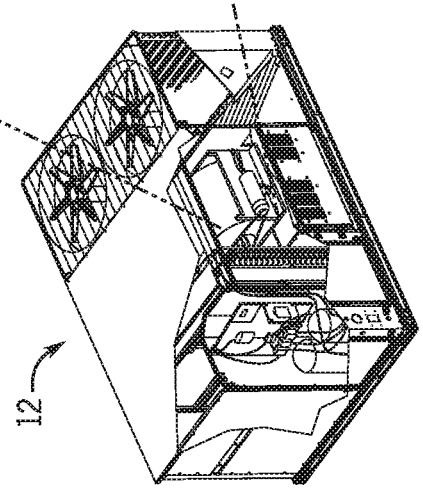

With this in mind, FIG. 5 is an expanded perspective view of an embodiment of the blower assembly 34 and the motor 36 that may each be utilized in the HVAC unit 12 as described above with respect to FIG. 2. However, in additional or alternative embodiments, the blower assembly 34 and the motor 36 may be implemented in any suitable HVAC system, such as the residential heating and cooling system 50. During operation of the HVAC unit 12, the blower assembly 34 may direct an air flow through the HVAC unit 12. For example, the blower assembly 34 may include a fan 150, and the motor 36 may be a fan motor that drives rotation of the fan 150 to draw or force the air flow through the HVAC unit 12. In some embodiments, the blower assembly 34 may direct a supply air flow, such as an ambient air flow or a return air flow, across a heat exchanger, such as the heat exchanger 30, so as to condition the supply air flow.

In additional or alternative embodiments, the blower assembly 34 may be configured to direct a different air flow, such as an ambient air flow, across the heat exchanger 28 to cool a refrigerant and/or to direct a return air flow from a structure into the HVAC unit 12. In any case, during operation of the HVAC unit 12, the motor 36 may be used to rotate a shaft of the blower assembly 34, and rotation of the shaft may cause rotation of the fan 150 to generate or direct the air flow.

In the illustrated embodiment, the motor 36 is positioned such that a first rotational axis 152 of the motor 36 is offset with respect to a second rotational axis 154 of the blower assembly 34. Accordingly, rotational motion of the shaft of the motor 36 may not be directly transferred to the fan 150 of the blower assembly. For this reason, the motor 36 may have a sheave 156 configured to rotate during operation of the motor 36, and the blower assembly 34 may have a pulley 158 coupled to the fan 150. Furthermore, a belt 160 may be installed to wrap around and engage with the pulley 158 and the sheave 156 such that rotational motion may be transferred from the motor 36 to the blower assembly 34. As an example, operation of the motor 36 may cause the sheave 156 to rotate, thereby causing the belt 160 to rotate as well. Rotation of the belt 160 may then cause the pulley 158 to rotate, thereby driving the fan 150 of the blower assembly 34 to rotate and direct the air flow. In some embodiments, the sheave 156 may be adjustable, and a diameter of the belt 160 about the sheave 156 may be changed. For instance, the diameter of the belt 160 about the sheave 156 may be increased to increase the amount in which a single rotation of the sheave 156 causes the pulley 158 to rotate. Additionally, the diameter of the belt 160 about the sheave 156 may be reduced to reduce the amount in which a single rotation of the sheave 156 causes the pulley 158 to rotate. In other words, the sheave 156 may be adjusted to change the rate at which the pulley 158 rotates in response to rotation of the sheave 156. Additionally or alternatively, the sheave 156 may be adjusted to adjust a tension of the belt 160. For instance, increasing the diameter of the belt 160 about the sheave 156 may increase the tension of the belt 160, and reducing the diameter of the belt 160 may reduce the tension of the belt 160. As such, the sheave 156 may be adjusted accordingly based on a desirable rotation rate of the belt 160 and/or a desirable tension of the belt 160.

To enable desirable positioning of the belt 160, the position of the motor 36 may be adjusted. In one example, the motor 36 may be moved relative to the blower assembly 34 to enable the belt 160 to be attached to the pulley 158 and/or the sheave 156 without having to remove or detach the motor 36 from the HVAC unit 12. In other words, the motor 36 may be moved relative to the blower assembly 34 for installation of the belt 160 into the HVAC unit 12. In another example, after the belt 160 has been installed in the HVAC unit 12, it may be desirable to position the motor relative to the blower assembly 34 to align the sheave 156 with the pulley 158, such as by positioning the sheave 156 and the pulley 158 in a common plane to enable effective engagement between the sheave 156, the belt 160, and the pulley 158.

To this end, the motor 36 may be attached to an adjustable motor mount 162 configured to enable the motor 36 to move relative to the blower assembly 34. For instance, the adjustable motor mount 162 may be configured to couple to mounting rails 164 of a support structure 166 of the HVAC unit 12. The motor mount 162 may include a first mounting bracket 168 configured to couple to the mounting rails 164. The first mounting bracket 168 is also be configured to selectively move or translate along the mounting rails 164. By way of example, the first mounting bracket 168 may be adjustably positioned along a first axis 170 of the mounting rails 164. That is, the mounting rails 164 may each extend along the first axis 170. As used herein, extending along an axis, such as the first axis 170, includes aligning with, extending generally parallel with, or extending alongside the axis. As such, the mounting rails 164 may each extend along the first axis 170. Furthermore, the motor mount 162 may include a second mounting bracket 172 coupled to the first mounting bracket 168. As will be further described below, the second mounting bracket 172 may be configured to selectively move or translate relative to the first mounting bracket 168 so as to be adjustably positioned along a second axis 174 of the first mounting bracket 168. The motor 36 may be configured to mount to the second mounting bracket 172, and therefore the first mounting bracket 168 and/or the second mounting bracket 172 may be adjustably positioned to move the motor 36 relative to the blower assembly 34. In this way, the motor mount 162 may be used to position the sheave 156 relative to the pulley 158 during installation of the belt 160. In an example, moving the second mounting bracket 172 relative to the first mounting bracket 168 along the second axis 174 may adjust an alignment between the sheave 156 and the pulley 158 so as to enable the belt 160 to effectively engage the belt 160 with the sheave 156 and the pulley 158 and enable transfer of rotational motion from the sheave 156 to the pulley 158. In another example, moving the first mounting bracket 168 relative to the mounting rails 164 along the first axis 170 may adjust a tension of the belt 160, such as to increase the tension of the belt 160 by moving the sheave 156 away from the pulley 158 or to reduce the tension of the belt 160 by moving the sheave 156 toward the pulley 158.

In the illustrated embodiment, the motor mount 162 also includes a fixed bracket 176 for facilitating movement of the first mounting bracket 168 along the first axis 170. By way of example, the fixed bracket 176 may be disposed between the mounting rails 164 and may be fixedly attached to the mounting rails 164, such as via a fastener, a weld, an adhesive, or any combination thereof. Additionally, the first mounting bracket 168 may have a mounting flange 178, and one or more rods or bolts 180 may extend through the fixed bracket 176 and the mounting flange 178. The rods 180 may be used to guide the first mounting bracket 168 to move along the first axis 170, thereby enabling the first mounting bracket 168 to remain coupled to the mounting rail 164 while moving along the mounting rail 164. In additional or alternative embodiments, the first mounting bracket 168 may have first slots 182, and the mounting rails 164 may each have corresponding holes 184. In an installed configuration of the motor mount 162, each hole 184 may be aligned with one of the slots 182. Accordingly, a fastener may be inserted through each of the slots 182 and corresponding holes 184, thereby coupling the first mounting bracket 168 onto the mounting rails 164. For instance, the fastener may tighten the first mounting bracket 168 and the mounting rails 164 together to restrict movement between the first mounting bracket 168 and the mounting rails 164, thereby securing a position of the motor 36 along the first axis 170.

In the illustrated embodiment, the first mounting bracket 168 has an L-shaped profile. For instance, the first mounting bracket 168 may have a first base plate 186 and a first side flange 188 extending transversely from the first base plate 186. The first base plate 186 may be positioned to abut a first mounting rail 164A and a second mounting rail 164B in the installed configuration, and the first side flange 188 may be configured to abut one of the mounting rails 164, such as the first mounting rail 164A. In the installed configuration, the first slots 182 formed in the first base plate 186 may align with the holes 184 formed in the second mounting rail 164B, and the first slots 182 formed in the first side flange 188 may align with the holes 184 formed in the first mounting rail 164A. As such, the first slots 182 of the first base plate 186 may be used for securing the position of the first mounting bracket 168 relative to the second mounting rail 164B, and the first slots 182 of the first side flange 118 may be used for securing the position of the first mounting bracket 168 relative to the first mounting rail 164A. In additional or alternative embodiments, the first mounting bracket 168 may have any suitable shape, such as a substantially flat shape, a U-shape, or any other suitable shape, configured to couple to the mounting rails 164.

As shown in the illustrated embodiment, the first axis 170 is transverse, such as generally perpendicular, with respect to the second axis 174, and the second axis 174 is generally parallel to the rotational axes 152, 154. As used herein, generally perpendicular includes a ninety degree angle or within a range, such as within two degrees, within five degrees, or within ten degrees of a ninety degree angle. In additional or alternative embodiments, the axes 152, 154, 170, 174 may be oriented relative to one another in a different manner. Furthermore, the support structure 166 may be a base structure of the HVAC unit 12 and the support structure 166 may therefore enable the motor 36 to be moved along a surface onto which the HVAC unit 12 is mounted, such as the ground or a rooftop. In additional or alternative embodiments, the motor 36 may be mounted to another support structure, such as a wall 190 oriented transversely with respect to the illustrated support structure 166, and the motor 36 may be moved along the wall 190 to move relative to the blower assembly 34. Further still, although the illustrated sheave 156 is coupled to a single belt 160, in additional or alternative embodiments, the sheave 156 may be coupled to multiple belts 160, such as two belts 160, three belts 160, or four or more belts 160. For example, the motor 36 may be rotatably coupled to multiple blower assemblies 34 having separate belts 160. Accordingly, the motor 36 may be configured to drive multiple blower assemblies 34 so as to direct multiple air flows through the HVAC unit 12.

Figure 6:
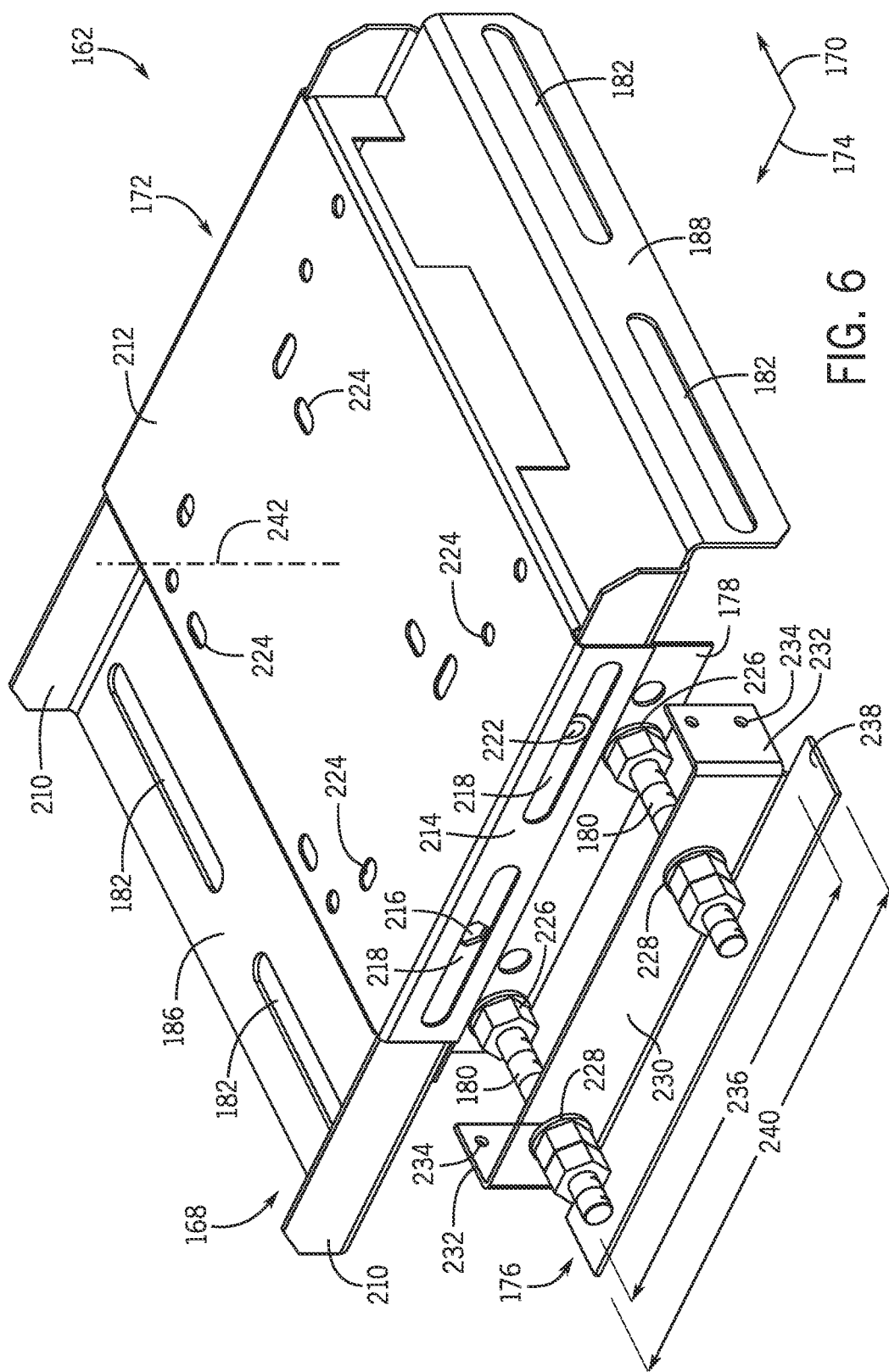
FIG. 6 is a perspective view of an embodiment of a motor mount, in accordance with an aspect of the present disclosure.

FIG. 6 is a perspective view of an embodiment of the motor mount 162 having the first mounting bracket 168, the second mounting bracket 172, and the fixed bracket 176. In certain embodiments, the first mounting bracket 168 may further include second side flanges 210 extending transversely from the first base plate 186, such as in a direction that is substantially opposite the direction in which the first side flange 188 extends from the first base plate 186. Additionally, the second mounting bracket 172 may include a second base plate 212 and third side flanges 214 extending from the second base plate 212. In the installed configuration, the third side flanges 214 may engage the second side flanges 210 to couple or align the first mounting bracket 168 and the second mounting bracket 172 with one another. For instance, the third side flanges 214 of the second mounting bracket 172 may abut the second side flanges 210 of the first mounting bracket 168 such that the second mounting bracket 172 is directly coupled to the first mounting bracket 168.

First apertures 216 may also be formed in the second side flanges 210, and second slots 218 may be formed in the third side flanges 214. In the installed configuration, each first aperture 216 may be aligned with one of the second slots 218 to enable a fastener, such as a threaded bolt, to extend through each second slot 218 and corresponding first aperture 216 to couple the first mounting bracket 168 and the second mounting bracket 172 to one another. For example, one of the first apertures 216 may have a polygonal geometry, such as a triangular shape, a rectangular shape, a pentagonal shape, a hexagonal shape, or the like, and a nut 222, such as a rivet nut, may be inserted through the first aperture 216. The polygonal geometry of the first aperture 216 may capture and rotationally secure the nut 222 within the first aperture 216. Further, the nut 222 may be threaded such that the bolt may be threadably inserted through and secured within the nut 222. Thus, the bolt may extend through one of the first apertures 216 and one of the second slots 218, and the bolt may be used to tighten the first mounting bracket 168 and the second mounting bracket 172 to one another, thereby restricting movement between the first mounting bracket 168 and the second mounting bracket 172 along the second axis 174. Accordingly, the bolt may be used to fix a position of the sheave 156 relative to the pulley 158 along the second axis 174.

With the second base plate 212 positioned over and against the second side flanges 210, the second base plate 212 and the first base plate 186 may be offset from one another. In other words, the first base plate 186 does not abut the second base plate 212. Accordingly, there may be a space or gap formed between the second base plate 212 and the first base plate 186. The space may accommodate additional fasteners that may be used to couple the motor 36 onto the second mounting bracket 172. By way of example, the second base plate 212 of the second mounting bracket 172 may have openings 224 that may align with corresponding openings or mounting points of the motor 36, such as on a base of the motor 36. Fasteners may be inserted through the aligned openings to mount the motor 36 onto the second base plate 212. The fasteners may extend into the space between the second base plate 212 and the first base plate 186. The second side flanges 210 may offset the second base plate 212 from the first base plate 186 so that the fasteners do not contact the first base plate 186 in the installed configuration.

As shown in FIG. 6, the mounting flange 178 of the first mounting bracket 168 may generally extend away from the first base plate 186 in substantially the same direction in which the first side flange 188 extends away from the first base plate 186. The mounting flange 178 may include a set of second apertures 226 configured to align with respective third apertures 228 formed in the fixed bracket 176. In the illustrated embodiment, the fixed bracket 176 may have a base segment 230 in which the third apertures 228 are formed. Respective rods 180 may be inserted through the aligned second apertures 226 and third apertures 228. The mounting flange 178 and therefore the first mounting bracket 168 may be secured to the rods 180, as discussed below. Further, the rods 180 may be configured to move relative to the fixed bracket 176, such as by moving through the third apertures 228. For example, the rods 180 may generally extend and move along the first axis 170 to enable the first mounting bracket 168 to move along the first axis 170 relative to the fixed bracket 176. As will be described in greater detail below, a set of nuts may be used to secure the rods 180 relative to the mounting bracket 178 and/or to secure the fixed bracket 176 to the rods 180, thereby setting a position of the first mounting bracket 168 along the first axis 170.

The fixed bracket 176 may also have fourth side flanges 232 extending transversely from the base segment 230. In the installed configuration, the fourth side flanges 232 may be fixedly coupled to the respective mounting rails 164, thereby securing a position of the fixed bracket 176 relative to the mounting rails 164. For instance, each of the fourth side flanges 232 may have features 234, such as holes, configured to align with respective features formed in the mounting rails 164. The aligned features may each be configured to receive a respective fastener configured to secure the fixed bracket 176 to the mounting rails 164, thereby restricting movement between the fixed bracket 176 and the mounting rails 164. In some embodiments, the base segment 230 may extend a first length 236 that separates the fourth flanges 232 from one another. The first length 236 may correspond to a distance spanning between the mounting rails 164. Accordingly, the fixed bracket 176 may be positioned between the mounting rails 164, such that the fourth side flanges 232 abut the respective mounting rails 164. As an example, the fixed bracket 176 may fit between the respective mounting rails 164 via an interference fit, such that the mounting rails 164 abut the respective fourth side flanges 232 to capture the fixed bracket 176, further restricting movement of the fixed bracket 176 relative to the mounting rails 164 to secure the fixed bracket 176 to the mounting rails 164.

In additional or alternative embodiments, the fixed bracket 176 may have a flange 238 extending transversely from the base segment 230, such as in a direction that is substantially opposite the direction in which the fourth side flanges 232 extend from the base segment 230. In some implementations, the flange 238 may have a second length 240 that extends along the first length 236 and is greater than the first length 236. Thus, the flange 238 may extend transversely past the fourth side flanges 232. Accordingly, the flange 238 may extend into or along the mounting rails 164 in the installed configuration. For instance, each of the mounting rails 164 may have slots or openings through which the flange 238 may extend. Thus, the mounting rails 164 may capture the flanges 238, thereby restricting movement of the flanges 238 relative to the mounting rails 164 to secure the fixed bracket 176 to the mounting rails 164.

In certain embodiments, the motor mount 162 may enable some rotation of the second mounting bracket 172 and therefore of the motor 36 relative to the blower assembly 34. For instance, a tolerance or gap may separate the third side flanges 214 of the second mounting bracket 172 from the second side flanges 210. Thus, the second mounting bracket 172 may partially rotate about a center axis 242 extending through a center of the second mounting bracket 172. In other words, spaces may be formed between at least a portion of the third side flanges 214 and the respective second side flanges 210 to enable the second mounting bracket 172 to rotate about the first mounting bracket 168. Similarly, in additional or alternative embodiments, gaps or tolerances may separate the first side flange 188 from the first mounting rail 164A. In this configuration, the rods 180 may be adjusted or tightened differently from one another in order to slightly rotate first mounting bracket 168 relative to the mounting rails 164 and thereby rotate the motor 36 relative to the blower assembly 34. In this way, the position of the motor mount 162 may be selectively adjusted about the center axis 242 to adjust tension in the belt 160.

Figure 7:
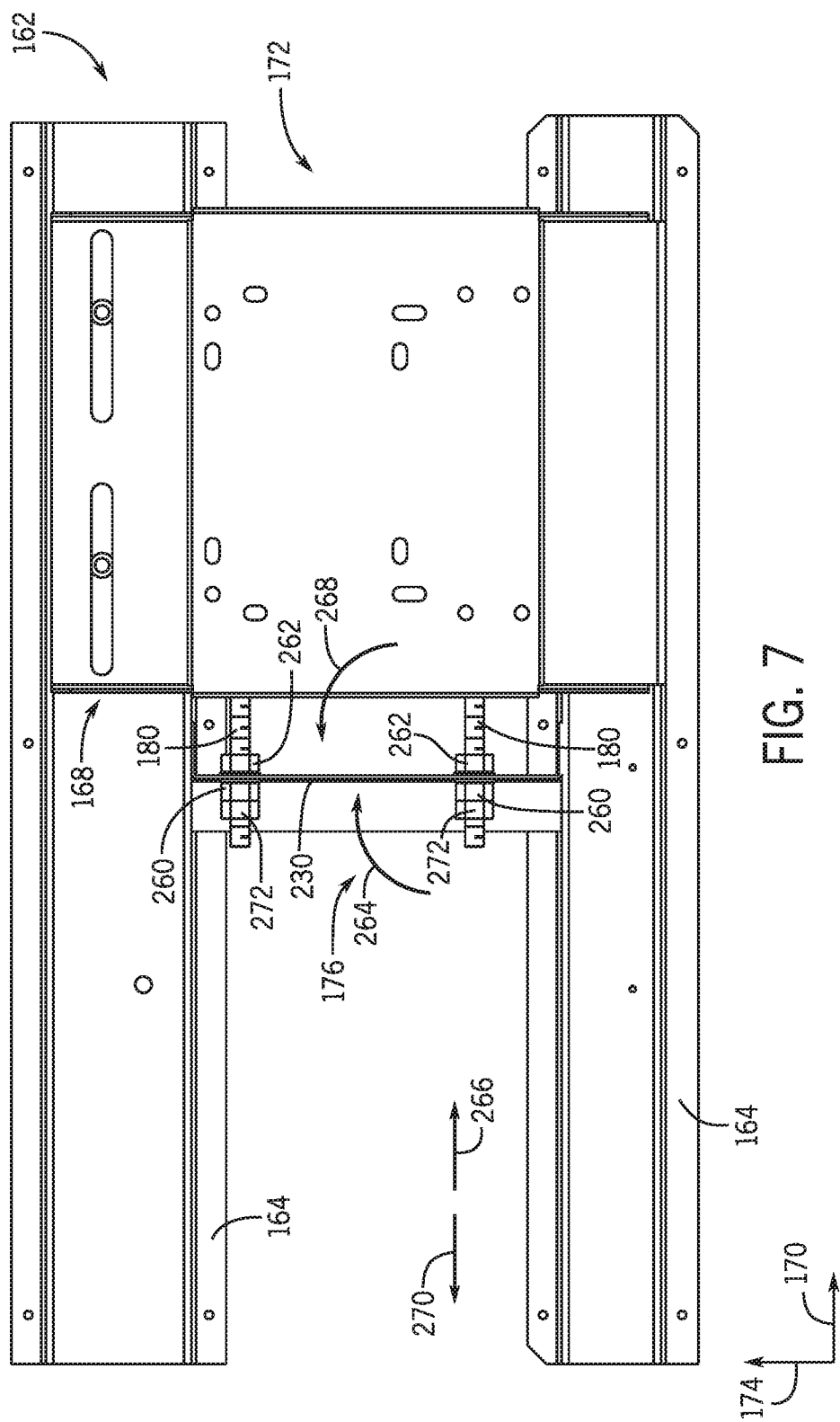
FIG. 7 is a top view of the motor mount of FIG. 6, in accordance with an aspect of the present disclosure.

FIG. 7 is a top view of the motor mount 162 of FIG. 6. As shown in FIG. 6, a position of each rod 180 may be secured to the fixed bracket 176 using a respective first nut 260 and a respective second nut 262. For instance, each rod 180 may be a threaded rod, and the first nut 260 and the second nut 262 may threadably engage a corresponding rod 180. Each first nut 260 may be positioned to abut a first surface or side 264 of the base segment 230 of the fixed bracket 176. Thus, the first nuts 260 may substantially block movement of the rods 180 in a first direction 266 along the first axis 170 relative to the fixed bracket 176. Furthermore, each second nut 262 may be positioned to abut a second surface or side 268 of the base segment 230 of the fixed bracket 176 opposite the first surface 264. As such, the second nuts 260 may substantially block movement of the rods 180 in a second direction 270 along the first axis 170 relative to the fixed bracket 176. In this way, the first nuts 260 and the second nuts 262 collectively fix axial positions of the rods 180 relative to the fixed bracket 176.

In the illustrated embodiment, third nuts 272 may also be positioned onto the rods 180, such as against a respective first nut 260. The third nuts 272 may additionally secure the position of the first nuts 260 to abut the first surface 264 of the base segment 230. In certain embodiments, further features or components, such as a lock washer, an adhesive, a weld, and the like, may be used to secure the rods 180 relative to the fixed bracket 176 along the first axis 170.

The first nuts 260, the second nuts 262, and the third nuts 272 may also be used to enable the first mounting bracket 168 and the rods 180 to move relative to the fixed bracket 176 along the first axis 170. For instance, the first mounting bracket 168 and the rods 180 may be fixedly coupled to one another. For this reason, the rods 180 may be moved relative to the fixed bracket 176 in order to move the first mounting bracket 168 relative to the fixed bracket 176. In an example, to enable the first mounting bracket 168 and the rods 180 to move in the first direction 266, the first nuts 260 and the third nuts 272 may be positioned such that the first nuts 260 and the third nuts 272 no longer abut the first surface 264 of the base segment 230. Accordingly, the rods 180 may move in the first direction 266 through the base segment 230, thereby causing the first mounting bracket 168 to move in the first direction 266 relative to the fixed bracket 176. In another example, to enable the first mounting bracket 168 and the rods 180 to move in the second direction 270, the second nuts 262 may be positioned such that the second nuts 262 no longer abut the second surface 268 of the base segment 230. Thus, the rods 180 may move in the second direction 270 through the base segment 230, thereby causing the first mounting bracket 168 to move in the second direction 270 relative to the fixed bracket 176. In any case, when the first mounting bracket 168 is moved to a desirable position relative to the fixed bracket 176, the first nuts 260 may be positioned to abut against the first surface 264 of the base segment 230, and the second nuts 262 may be positioned to abut against the second surface 268 of the base segment 230, thereby securing the position of the first mounting bracket 168 relative to the fixed bracket 176.

FIG. 8 is a bottom perspective view of the motor mount 162 of FIGS. 6 and 7. In the illustrated embodiment, the mounting flange 178 is a separate component from the first mounting bracket 168 and therefore may be coupled to the first mounting bracket 168 in the installed configuration. For instance, the mounting flange 178 may include a first section 280 having the third apertures 228 through which the rods 180 may extend. Additionally, the mounting flange 178 may have a second section 282 extending transversely from the first section 280. The second section 282 may be configured to couple to the first base plate 186 of the first mounting bracket 168. For example, the mounting flange 178 may have features 284, such as holes, configured to align with corresponding features formed in the first base plate 186. Fasteners may be inserted through the aligned features to couple the mounting flange 178 to the first base plate 186, such as on a side 286, which may be an underside, of the first base plate 186. The fasteners may extend through the second section 282 and the first base plate 186 into the space formed between the first base plate 186 and the second base plate 212 and may not contact the second base plate 212. In additional or alternative embodiments, the mounting flange 178 may be coupled to the first base plate 186 in another manner, such as via a weld, a tab, a punch, an adhesive, another suitable component, or any combination thereof. In further embodiments, the mounting flange 178 may be integrally formed with the first base plate 186 as a signal piece component.

Nuts may also be used to restrict movement of the mounting flange 178 relative to the rods 180. For example, fourth nuts 288 may threadably engage each rod 180 to abut a third surface or side 290 of the first section 280. As such, the fourth nut 288 may block movement of the mounting flange 178 and therefore of the first mounting bracket 168 in the first direction 266 along the rods 180. Moreover, fifth nuts 292 may threadably engage each rod 180 to abut a fourth surface or side 294 of the first section 280 opposite the third surface 290. Thus, the fifth nuts 292 may block movement of the mounting flange 178, and therefore of the first mounting bracket 168, in the second direction 270 along the rods 180.

In some embodiments, the fourth nuts 288 and the fifth nuts 292 may be configured to secure the rod 180 to the mounting flange 178 along the first axis 170. For example, the positions of the fourth nuts 288 may be maintained to abut against the third surface 290 of the first section 280, and the positions of the fifth nuts 292 may be maintained to abut against the fourth surface 294 of the first section 280. In this manner, the fourth nuts 288 and the fifth nuts 292 restrict movement between the first mounting bracket 168 relative to the rods 180 along the first axis 170, and the fourth nuts 288 and the fifth nuts 292 are not used to move the first mounting bracket 168 relative to the fixed bracket 176. Rather, as described above, the first nuts 260, the second nuts 262, and/or the third nuts 272 may be used to move the first mounting bracket 168 relative to the fixed bracket 176. By way of example, the first nuts 260, the second nuts 262, and/or the third nuts 272 may be exposed in the installed configuration and/or may otherwise be readily accessible to a user for adjustment. Accordingly, a user may be able to adjust the first nuts 260, the second nuts 262, and/or the third nuts 272 to move the first mounting bracket 168 relative to the fixed bracket 176. However, the fourth nuts 288 and/or the fifth nuts 292 may not be as accessible to the user in the installed configuration and therefore, the respective positions of the fourth nuts 288 and/or the fifth nuts 292 may be maintained to couple the rod 180 to the mounting flange 178. Further still, the fourth nuts 288 and/or the fifth nuts 292 may be used in additional to or as an alternative to the first nuts 260, the second nuts 262, and/or the third nuts 272 for adjusting the first mounting bracket 168 relative to the fixed bracket 176 in certain embodiments. In further embodiments, another suitable feature may be used to move the first mounting bracket 168 relative to the fixed bracket 176. For instance, the motor mount 162 may have a lockable bearing, an actuator, another suitable feature, or any combination thereof to move and/or set a position of the first mounting bracket 168 relative to the fixed bracket 176.

The present disclosure may provide one or more technical effects useful in the operation of an HVAC system. For example, an adjustable motor mount may be implemented to support a fan motor for driving a blower assembly. The motor mount may also be used to move the fan motor relative to the blower assembly, such as during installation or maintenance of the HVAC system. As an example, the HVAC system may have a belt configured to rotatably couple a shaft of the motor with a fan of the blower assembly. The motor mount may be adjustable in multiple directions to enable acute positioning of the motor relative to the blower assembly. The multiple degrees of adjustment enables desirable engagement between the motor, the blower assembly, and the belt to effectuate efficient transfer of rotational motion from the motor to the blower assembly. In some embodiments, the motor mount may include a first mounting bracket configured to couple to a mounting rail of a support structure of the HVAC system. The motor mount may also include a second mounting bracket configured to couple to the first mounting bracket and configured to couple to the fan motor. The first mounting bracket may be adjustably positioned along a first axis of the mounting rail, and the second mounting bracket may be adjustably positioned along a second axis of the first mounting bracket. As such, the fan motor may be selectively and independently moved along the first axis and the second axis relative to the blower assembly. The motor mount may further include a fixed mounting bracket to which the first mounting bracket is coupled. The fixed bracket may guide the first mounting bracket to move along the mounting rails and may facilitate securement of a position of the first mounting bracket relative to the mounting rails, thereby securing a position of the fan motor along the first axis. Further, a fastener may be inserted through the first mounting bracket and the second mounting bracket to secure a position of the second mounting bracket relative to the first mounting bracket, thereby securing a position of the motor along the second axis. As such, the motor mount may secure a desired position of the motor relative to the blower assembly. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating ventilation, and/or air conditioning (HVAC) system, comprising:

a support structure including a mounting rail;
a first mounting bracket coupled to the mounting rail and configured to be adjustably positioned along a first axis; and
a second mounting bracket directly coupled to the first mounting bracket, wherein the second mounting bracket comprises a surface configured to support a fan motor mounted thereto, wherein the second mounting bracket is configured to be adjustably positioned along a second axis, the second axis is transverse to the first axis, and the surface extends from a first end of the first mounting bracket to a second end of the first mounting bracket.

2. The HVAC system of claim 1, comprising the fan motor mounted to the second mounting bracket, wherein the fan motor has a rotational axis, and the rotational axis and the second axis are parallel with one another.

3. The HVAC system of claim 1, wherein the first mounting bracket includes a first base plate and a first side flange extending from the first base plate, the first side flange includes an aperture, the second mounting bracket includes a second base plate and a second side flange extending from the second base plate, the second side flange includes a slot, and the HVAC system includes a bolt configured to extend through the aperture and the slot to secure a position of the second mounting bracket relative to the first mounting bracket along the second axis.

4. The HVAC system of claim 3, wherein the aperture has a polygonal geometry, the first side flange includes a rivet nut secured within the aperture, and the bolt is configured to thread into the rivet nut.

5. The HVAC system of claim 1, comprising a fixed bracket coupled to the mounting rail and having a first aperture, wherein the first mounting bracket includes a mounting flange having a second aperture, and the HVAC system includes a threaded rod extending through the first aperture, the second aperture and a nut to secure a position of the first mounting bracket relative to the mounting rail along the first axis.

6. The HVAC system of claim 5, wherein the nut is one of a plurality of nuts including a first nut coupled to the threaded rod on a first side of the fixed bracket, a second nut coupled to the threaded rod on a second side of the fixed bracket, a third nut coupled to the threaded rod on a first side of the mounting flange, and a fourth nut coupled to the threaded rod on a second side of the mounting flange.

7. The HVAC system of claim 5, wherein the fixed bracket includes a base segment having the first aperture, the fixed bracket includes a side flange extending transversely from the base segment, and the side flange is fixedly coupled to the mounting rail.

8. The HVAC system of claim 7, wherein the fixed bracket includes a flange extending transversely from the base segment, and the flange extends transversely past the side flange to extend into or along the mounting rail.

9. The HVAC system of claim 1, wherein the mounting rail includes a hole, the first mounting bracket includes a slot, and the HVAC system includes a fastener extending through the hole and the slot to secure a position of the first mounting bracket relative to the mounting rail along the first axis.

10. The HVAC system of claim 1, wherein the first mounting bracket comprises a first side flange at the first end and a second side flange at the second end, and the surface of the second mounting bracket extends from the first side flange to the second side flange.

11. A motor mount for a heating, ventilation, and air conditioning (HVAC) system, comprising:
a first mounting bracket configured to couple to a mounting rail of the HVAC system;
a second mounting bracket configured to directly couple to the first mounting bracket, wherein the second mounting bracket is adjustably positioned relative to the first mounting bracket along a first axis;
a fixed bracket configured to fixedly couple to the mounting rail; and
a rod configured to extend through the first mounting bracket and the fixed bracket, wherein the rod is configured to enable adjustment of a position of the first mounting bracket relative to the fixed bracket along a second axis transverse to the first axis.

12. The motor mount of claim 11, wherein the first mounting bracket includes a mounting flange having a first aperture, the fixed bracket includes a second aperture, and the rod extends through the first aperture and the second aperture.

13. The motor mount of claim 12, wherein the rod is a threaded rod, the motor mount includes a first nut and a second nut threadably coupled to the threaded rod, the first nut is configured to abut a first surface of the mounting flange, and the second nut is configured to abut a second surface of the mounting flange opposite the first surface to fixedly secure the threaded rod to the mounting flange along the second axis.

14. The motor mount of claim 13, comprising a third nut and a fourth nut threadably coupled to the threaded rod, wherein the third nut is configured to abut a third surface of the fixed bracket and the fourth nut is configured to abut a fourth surface of the fixed bracket to secure a position of the threaded rod and of the mounting flange relative to the fixed bracket along the second axis.

15. The motor mount of claim 12, wherein the mounting flange includes a first section having the first aperture and a second section extending transversely from the first section, wherein the second section is secured to a base plate of the first mounting bracket.

16. The motor mount of claim 11, wherein the first mounting bracket includes a base plate and a side flange extending transversely from the base plate to form an L-shaped profile.

17. The motor mount of claim 16, wherein the mounting rail is a first mounting rail, the base plate includes a first slot configured to align with a first aperture of the first mounting rail, and the side flange includes a second slot configured to align with a second aperture of a second mounting rail of the HVAC system.

18. A heating, ventilation, and/or air conditioning (HVAC) system, comprising:
a support structure having a first mounting rail and a second mounting rail that each extends along a first axis;
a first mounting bracket having a base plate and a side flange extending transversely from the base plate, wherein the base plate is configured to abut the first mounting rail and the second mounting rail, the side flange is configured to abut the first mounting rail, and a position of the first mounting bracket is adjustable along the first axis; and
a second mounting bracket coupled to the first mounting bracket, wherein a position of the second mounting bracket is adjustable along a second axis that is transverse to the first axis, and the second mounting bracket is configured to secure a motor thereto.

19. The HVAC system of claim 18, comprising:
a fixed bracket coupled to the first and second mounting rails, wherein the fixed bracket includes a first aperture;
a mounting flange coupled to the base plate of the first mounting bracket and including a second aperture;
a rod extending through the first aperture and the second aperture along the first axis;
a first plurality of nuts coupled to the rod adjacent to the fixed bracket to secure the rod to the fixed bracket along the first axis, wherein the first plurality of nuts is adjustable to adjust the position of the first mounting bracket along the first axis; and
a second plurality of nuts coupled to the rod adjacent to the mounting flange to secure the rod to the mounting flange along the first axis.

20. The HVAC system of claim 18, wherein the base plate is a first base plate, the side flange is a first side flange, the first mounting bracket includes a second side flange extending transversely from the first base plate, the second mounting bracket includes a second base plate and a third side flange extending transversely from the second base plate, the second side flange and the third side flange overlap with one another, and the second base plate abuts the second side flange to offset the first base plate from the second base plate and form a space therebetween.

21. The HVAC system of claim 20, wherein the second base plate includes a plurality of mounting apertures configured to align with mounting features of the motor to secure the motor to the second mounting bracket.

22. The HVAC system of claim 18, wherein the side flange is a first side flange, the HVAC system comprises a fixed bracket disposed between the first mounting rail and the second mounting rail, and the fixed bracket includes a second side flange coupled to the first mounting rail and a third side flange coupled to the second mounting rail.

23. The HVAC system of claim 18, comprising the motor coupled to the second mounting bracket, a blower assembly mounted to the support structure, and a belt engaged with the motor and the blower assembly to transfer rotational motion of the motor to the blower assembly.

24. The HVAC system of claim 23, wherein the blower assembly is offset from the first mounting rail and the second mounting rail along the second axis.

25. The HVAC system of claim 24, wherein the motor includes a sheave and is configured to rotate the sheave, the blower assembly includes a pulley, and the belt is engaged with the sheave and the pulley to transfer rotational motion from the motor to the blower assembly.

* * * * *